(12) United States Patent
Kim

(10) Patent No.: US 9,398,288 B2
(45) Date of Patent: *Jul. 19, 2016

(54) IR SIGNAL CAPTURE FOR IMAGES

(71) Applicant: Empire Technology Development LLC, Wilmington, DE (US)

(72) Inventor: Seungil Kim, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/611,952

(22) Filed: Feb. 2, 2015

(65) Prior Publication Data

US 2015/0145960 A1   May 28, 2015

Related U.S. Application Data

(63) Continuation of application No. 13/695,356, filed as application No. PCT/US2011/059413 on Nov. 4, 2011, now Pat. No. 8,976,249.

(51) Int. Cl.
*H04N 13/02* (2006.01)
*H04N 5/33* (2006.01)
*H04N 5/225* (2006.01)
*G06T 7/00* (2006.01)

(52) U.S. Cl.
CPC .......... *H04N 13/0253* (2013.01); *G06T 7/0073* (2013.01); *H04N 5/2256* (2013.01); *H04N 5/33* (2013.01); *G06T 2207/10028* (2013.01); *G06T 2207/10048* (2013.01); *G06T 2207/30196* (2013.01)

(58) Field of Classification Search
CPC .......... G06T 2207/10028; G06T 2207/10048; G06T 2207/30196; G06T 7/0073; H04N 13/0253; H04N 5/2256; H04N 5/33
USPC .......................................................... 348/46
See application file for complete search history.

(56) References Cited

U.S. PATENT DOCUMENTS

| | | | | |
|---|---|---|---|---|
| 4,740,806 A | * | 4/1988 | Takehana | G02B 7/32 356/3.04 |
| 5,862,844 A | | 1/1999 | Perrin | |
| 5,966,225 A | * | 10/1999 | Taglione | H04B 10/40 398/135 |
| 6,097,394 A | | 8/2000 | Levoy et al. | |
| 6,255,946 B1 | * | 7/2001 | Kim | G08B 13/184 250/221 |
| 6,341,016 B1 | | 1/2002 | Malione | |
| 6,775,014 B2 | * | 8/2004 | Foote | G01S 11/12 348/140 |
| 7,084,989 B2 | | 8/2006 | Johannesson et al. | |

(Continued)

FOREIGN PATENT DOCUMENTS

EP   1483740 B1   10/2008
JP   2004110804 A   4/2004

(Continued)

OTHER PUBLICATIONS

"Kinect," accessed at https://web.archive.org/web/20110927120808/http://en.wikipedia.org/wiki/Kinect, modified on Sep. 3, 2011, pp. 14.

(Continued)

*Primary Examiner* — Shan Elahi
(74) *Attorney, Agent, or Firm* — Brundidge & Stanger, P.C.

(57) ABSTRACT

Technologies and implementations for capturing images from IR signals are generally disclosed.

20 Claims, 9 Drawing Sheets

(56) References Cited

U.S. PATENT DOCUMENTS

| | | | |
|---|---|---|---|
| 7,463,772 B1 * | 12/2008 | Lefevere | G06K 9/3283 |
| | | | 345/419 |
| 7,660,458 B1 | 2/2010 | Saric | |
| 7,715,022 B2 | 5/2010 | Morimoto et al. | |
| 7,822,263 B1 | 10/2010 | Prokoski | |
| 8,184,194 B2 | 5/2012 | Sato et al. | |
| 8,317,615 B2 | 11/2012 | Takeda et al. | |
| 8,384,780 B1 | 2/2013 | Frank et al. | |
| 8,878,929 B2 | 11/2014 | Kim et al. | |
| 2002/0175270 A1 | 11/2002 | Boemler et al. | |
| 2003/0007074 A1 * | 1/2003 | Nagaoka | G06K 9/00805 |
| | | | 348/148 |
| 2004/0184667 A1 * | 9/2004 | Raskar | G06T 5/50 |
| | | | 382/254 |
| 2004/0184677 A1 | 9/2004 | Raskar et al. | |
| 2004/0212725 A1 * | 10/2004 | Raskar | G06T 15/02 |
| | | | 348/370 |
| 2005/0271279 A1 * | 12/2005 | Fujimura | G06K 9/00355 |
| | | | 382/203 |
| 2005/0281475 A1 | 12/2005 | Wilson | |
| 2006/0125658 A1 | 6/2006 | Dohler et al. | |
| 2006/0261931 A1 | 11/2006 | Cheng | |
| 2007/0189583 A1 * | 8/2007 | Shimada | G06K 9/2018 |
| | | | 382/118 |
| 2007/0208307 A1 * | 9/2007 | Knauper | A61M 5/14212 |
| | | | 604/131 |
| 2007/0285554 A1 | 12/2007 | Givon | |
| 2008/0103390 A1 | 5/2008 | Contag et al. | |
| 2008/0117289 A1 | 5/2008 | Schowengerdt et al. | |
| 2008/0122927 A1 * | 5/2008 | Konno | G08B 13/19626 |
| | | | 348/143 |
| 2008/0193043 A1 | 8/2008 | Wilson | |
| 2009/0079834 A1 | 3/2009 | Otsu | |
| 2009/0225329 A1 | 9/2009 | Bendall et al. | |
| 2009/0225333 A1 | 9/2009 | Bendall et al. | |
| 2010/0098330 A1 | 4/2010 | Finlayson et al. | |
| 2010/0194862 A1 | 8/2010 | Givon | |
| 2010/0214411 A1 | 8/2010 | Weinmann et al. | |
| 2010/0238294 A1 | 9/2010 | Hogasten et al. | |
| 2011/0080490 A1 | 4/2011 | Clarkson et al. | |
| 2011/0164133 A1 * | 7/2011 | Chang | H04N 5/2256 |
| | | | 348/143 |
| 2011/0293179 A1 * | 12/2011 | Dikmen | G06T 5/008 |
| | | | 382/167 |
| 2012/0050471 A1 | 3/2012 | Kim et al. | |
| 2012/0182410 A1 | 7/2012 | Wang et al. | |
| 2012/0190448 A1 * | 7/2012 | Larsen | A63F 13/06 |
| | | | 463/36 |
| 2013/0321462 A1 * | 12/2013 | Salter | G06F 1/163 |
| | | | 345/633 |
| 2014/0254880 A1 * | 9/2014 | Srinivasan | G06T 7/004 |
| | | | 382/106 |
| 2014/0320629 A1 * | 10/2014 | Chizeck | G06F 3/016 |
| | | | 348/81 |

FOREIGN PATENT DOCUMENTS

| | | |
|---|---|---|
| JP | 2007256257 A | 10/2007 |
| JP | 2007532929 A | 11/2007 |
| JP | 2009264862 A | 11/2009 |
| JP | 2010276607 A | 12/2010 |
| WO | 2009157129 A1 | 12/2009 |

OTHER PUBLICATIONS

"Multistatic radar," accessed at en.wikipedia.org/wiki/Multistatic_radar, modified on Jan. 7, 2011, pp. 1-4.

"Structured light," accessed at https://web.archive.org/web/20110422165442/http://en.wikipedia.org/wiki/Structured_light, modified on Mar. 26, 2011, p. 1.

"Structured-light 3D scanner," accessed at https://web.archive.org/web/20111025184248/http://en.wikipedia.org/wiki/Structured-light_3D_scanner, modified on Jun. 26, 2011, pp. 11.

Dibbell, J., "Gestural Interfaces Controlling computers with our bodies," accessed at http://www2.technologyreview.com/article/423687/gestural-interfaces/, pp. 1-2 (May-Jun. 2011).

Korean Intellectual Property Office, International Search Report and Written Opinion of the International Searching Authority for PCT/US2011/059413 mailed on Aug. 28, 2012, Republic of Korea.

Madhav, K., "3D face scanning using the kinect," accessed at https://web.archive.org/web/20110824115757/http://kinecthacks.net/3d-face-scanning-using-the-kinect/, posted on Feb. 7, 2011, pp. 6.

* cited by examiner

500 A computer program product.

502 A signal bearing medium.

504 Machine-readable instructions, which, if executed by one or more processors, operatively enable a computing device to:

receive, at an image capture device, a first infrared (IR) signal from a first IR emitter;

receive, at the image capture device, a second IR signal from a second IR emitter;

determine if a shadow region is detected from the received first IR signal from the first IR emitter; and/or facilitate emission of the first IR signal from the first IR emitter and emission of the second IR signal from the second IR emitter in an alternating pattern.

| 506 a computer-readable medium. | 508 a recordable medium. | 510 a communications medium. |

FIG. 5

800 A computer program product.

802 A signal bearing medium.

804 Machine-readable instructions, which, if executed by one or more processors, operatively enable a computing device to:

receive, at an image capture device, a first infrared (IR) signal from an IR emitter at a first position, the IR emitter configured to move in at least one of a substantially horizontal direction, a substantially vertical direction, or a substantially horizontal and vertical direction;

move the IR emitter to a second position; and/or receive, at the image capture device, a second IR signal from the IR emitter at the second position.

| 806 a computer-readable medium. | 808 a recordable medium. | 810 a communications medium. |

FIG. 8

IR SIGNAL CAPTURE FOR IMAGES

CROSS-REFERENCE TO RELATED APPLICATIONS

The present application is a continuation under 35 U.S.C §120 of codepending U.S. application Ser. No. 13/695,356 filed on Oct. 30, 2012, now U.S. Pat. No. 8,976,249, which is the National Stage filing under 35 U.S.C. §371 of PCT Application Ser. No. PCT/US11/59413 filed on Nov. 4, 2011. The U.S. application Ser. No. 13/695,356 and said PCT Application No. PCT/US11/59413 are hereby incorporated by reference herein in their entireties.

BACKGROUND

Unless otherwise indicated herein, the approaches described in this section are not prior art to the claims in this application and are not admitted to be prior art by inclusion in this section.

Since the release of Microsoft® Kinect, a depth camera has become a device which many people use. In the case of Kinect, depth information may be extracted using a structured light. As used herein the term "structured light" may refer to a process of projecting a specific infrared pattern onto an object where depth information may be calculated based at least in part on how much the projected pattern on the object is distorted (e.g., a degree of distortion of a projected pattern).

SUMMARY

Some example methods, apparatus, and systems related to capturing structured light images are described herein. In one example, such an apparatus may include a first infrared (IR) emitter, a second IR emitter, an image capture device, a processor, and/or a signal bearing medium. The first IR emitter may be configured to emit a first IR signal. The second IR emitter may be configured to emit a second IR signal. The image capture device may be configured to receive the first and second IR signals. The processor may be communicatively coupled to the first IR emitter, the second IR emitter, and/or the image capture device. The signal bearing medium may include machine-readable instructions stored thereon, which, if executed by the processor, may operatively enable a computing device to facilitate emission of the first and second IR signals from the first and second IR emitters in an alternating pattern, respectively.

In another example, an apparatus related to capturing structured light images may include an infrared (IR) emitter, an image capture device, a processor, and/or a signal bearing medium. The IR emitter may be configured to emit an IR signal and to move in at least one of a substantially horizontal direction, a substantially vertical direction, or a substantially horizontal and vertical direction. The image capture device may be configured to receive IR signals from one or more positions of the IR emitter. The processor may be communicatively coupled to the IR emitter and the image capture device. The signal bearing medium may include machine-readable instructions stored thereon, which, if executed by the processor, may operatively enable a computing device to move the IR emitter.

In a further example, a method of image processing related to capturing structured light images may include receiving, at an image capture device, a first infrared (IR) signal from a first IR emitter. A second IR signal may be received at the image capture device from a second IR emitter. A determination may be made whether a shadow region is detected from the received first IR signal from the first IR emitter. Emission of the first IR signal from the first IR emitter and emission of the second IR signal from the second IR emitter may be facilitated in an alternating pattern.

In a still further example, a method of image processing related to capturing structured light images may include receiving, at an image capture device, a first infrared (IR) signal from an IR emitter at a first position. The IR emitter may be configured to move in at least one of a substantially horizontal direction, a substantially vertical direction, or a substantially horizontal and vertical direction. The IR emitter may be moved to a second position. A second IR signal may be received at the image capture device from the IR emitter at the second position.

In yet another example, an article may include a signal bearing medium including machine-readable instructions stored thereon, which, if executed by a processor, operatively enable a computing device to capture structured light images. For example, a first infrared (IR) signal may be received at an image capture device from a first IR emitter. A second IR signal may be received at the image capture device from a second IR emitter. A determination may be made whether a shadow region is detected from the received first IR signal from the first IR emitter. Emission of the first IR signal from the first IR emitter and emission of the second IR signal from the second IR emitter may be facilitated in an alternating pattern.

In still another example, an article may include a signal bearing medium including machine-readable instructions stored thereon, which, if executed by a processor, operatively enable a computing device to capture structured light images. For example, a first infrared (IR) signal may be received at an image capture device from an IR emitter at a first position, the IR emitter may be configured to move in at least one of a substantially horizontal direction, a substantially vertical direction, or a substantially horizontal and vertical direction. The IR emitter may be moved to a second position. A second IR signal may be received at the image capture device from the IR emitter at the second position.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 is an illustration of an example computer program product that is arranged in accordance with at least some embodiments of the present disclosure;

FIG. 8 is an illustration of another example computer program product that is arranged in accordance with at least some embodiments of the present disclosure.

DETAILED DESCRIPTION

Figure 1:
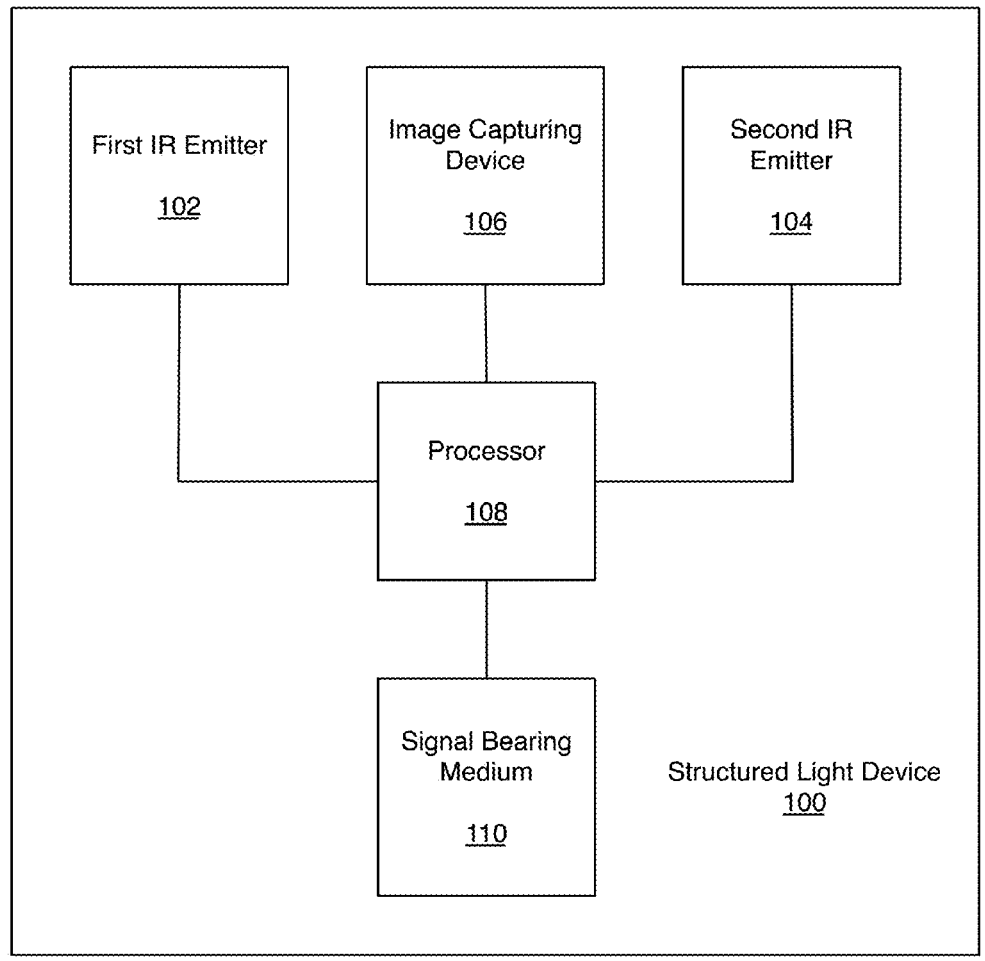
FIG. 1 illustrates an example structured light device that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related capturing images from first and second IR signals.

As discussed above, depth information may be extracted using a structured light. However, with some conventional structured light techniques, shadow regions can be formed along the silhouette of an object. Since structured light pattern cannot be seen in such shadow regions, depth information cannot be extracted.

FIG. 1 illustrates an example structured light device that is arranged in accordance with at least some embodiments of the present disclosure. In the illustrated example, a structured light device 100 may include a first infrared (IR) emitter 102, a second IR emitter 104, an image capture device 106, a processor 108, and/or a signal bearing medium 110.

First IR emitter 102 may be configured to emit a first IR signal. Similarly, second IR emitter 104 may be configured to emit a second IR signal. As used herein, the term "structured light" may refer to a process of projecting a specific infrared pattern onto an object where depth information may be calculated based at least in part on how much the projected pattern on the object is distorted (e.g., a degree of distortion of a projected pattern).

As will be described in greater detail below, first IR emitter 102 and second IR emitter 104 may alternate emissions, so that second IR emitter 104 may not emit the second IR signal while first IR emitter 102 is emitting the first IR signal. Likewise, first IR emitter 102 may not emit the first IR signal while second IR emitter 104 is emitting the second IR signal to avoid interference between the first and second IR signals. As will be described in greater detail below, such alternation may be governed by processor 108 determining when to switch between first IR emitter 102 and second IR emitter 104. For example, processor 108 may determine when to switch between first IR emitter 102 and second IR emitter 104 based at least in part on a time index. Such a time index may indicate when to begin emission from one of first IR emitter 102 and second IR emitter 104, how long such emission will last, and/or when to switch to the other of first IR emitter 102 and second IR emitter 104. Additionally, to utilize an end product of depth video at thirty frames per second, video at sixty frames per second may be obtained, as first IR emitter 102 and second IR emitter 104 may operate in alternating manner, for example.

In some examples, first IR emitter 102 and second IR emitter 104 may be positioned a predetermined distance apart from each other. In other examples, first IR emitter 102 and second IR emitter 104 may each be disposed on one or more tracks (not shown) configured to move first IR emitter 102 and/or second IR emitter 104. For example, first IR emitter 102 and/or second IR emitter 104 may be moved in at least one of a substantially horizontal direction, a substantially vertical direction, or both a substantially vertical and a substantially horizontal direction (e.g., as may be better illustrated by a structured light device 600 of FIG. 6). For example, as will be described in greater detail below, in such an example, first IR emitter 102 and/or second IR emitter 104 may be moved to alternative positions between readings.

Image capture device 106 may be configured to receive the first and second IR signals. In some examples, image capture device 106 may include a complementary metal oxide semiconductor (CMOS) device. For example, the CMOS device may include a monochrome CMOS sensor. In some examples, image capture device 106 may include a charge coupled device (CCD). In some examples, image capture device 106 may include a separate IR sensor and a separate visible spectrum sensor (e.g., a red-green-blue-type visible spectrum sensor).

Processor 108 may be communicatively coupled to first IR emitter 102, second IR emitter 104, and/or image capture device 106. Signal bearing medium 110 may include machine-readable instructions stored thereon, which, if executed by processor 108, may operatively enable a computing device (e.g., a computing device 900 of FIG. 9) to facilitate emission of the first and second IR signals from first IR emitter 102 and second IR emitter 104 in an alternating pattern, respectively.

In operation, the machine-readable instructions may operatively enable a computing device to determine depth of an image of an object based at least in part on the received first and second IR signals. Additionally or alternatively, the machine-readable instructions may operatively enable a computing device to determine if a shadow region is detected from the received first IR signal from the first IR emitter. In such an example, structured light device 100 may utilize an image corresponding to the received second IR signal from second IR emitter 104 if it is determined that a shadow region is detected from the received first signal from first IR emitter 102. Similarly, structured light device 100 may utilize an image corresponding to the received first IR signal from first IR emitter 102 if it is determined that a shadow region is not detected from the received first IR signal from first IR emitter 102.

Figure 2:
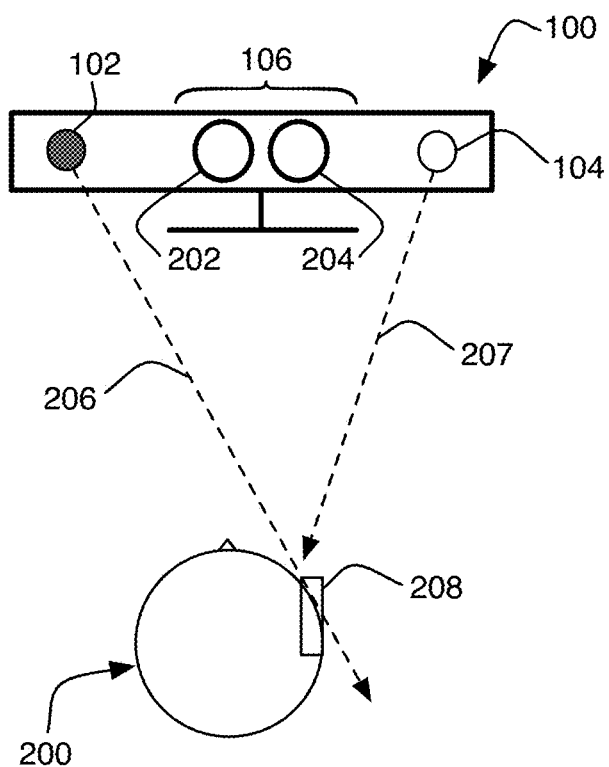
FIG. 2 illustrates an example structured light device capturing images of an object that is arranged in accordance with at least some embodiments of the present disclosure.

FIG. 2 illustrates an example structured light device 100 capturing images of an object 200 that is arranged in accordance with at least some embodiments of the present disclosure. In the illustrated example, image capture device 106 is illustrated as including a separate IR sensor 202 and a separate visible spectrum sensor 204 (e.g., a red-green-blue-type visible spectrum sensor).

As illustrated, object 200 (e.g., a user's head) may be captured by structured light device 100. For example, first IR emitter 102 may emit an IR signal 206 at time index n. Such time index n may indicate when to begin emission from first IR emitter 102, how long such emission will last, and/or when to switch to second IR emitter 104. In such an example, at this time, second IR emitter 104 may not emit an IR signal 207 to avoid interference. For example, if first IR emitter 102 and second IR emitter 104 emit simultaneously, it may not be possible to calculate depth since more than one IR pattern may be mixed together.

As illustrated, IR signal 206 from first IR emitter 102 may result in a shadow region 208 formed on object 200 (e.g., on the right side of the user's face). To remove this shadow region, second IR emitter 104 may emit IR signal 207 at time index n+1, instead of first IR emitter 102. Such time index n+1 may indicate when to begin emission from second IR emitter 104, how long such emission will last, and/or when to switch to first IR emitter 102. In cases where second IR emitter 104 has a better vantage point than first IR emitter 102, IR signal 207 from second IR emitter 104 may reduce (or eliminate) shadow region 208. In cases where IR signal 207 from second IR emitter 104 reduces (or eliminates) shadow region 208, images associated with second IR emitter 104 may be selected for use instead of images associated with first IR emitter 102.

Alternatively, a portion of depth information from images associated with second IR emitter 104 may be used in conjunction with a portion of depth information from images associated with first IR emitter 102. In such an example, depth information associated with the image at time n and depth information associated with the image at time n+1 may be utilized to minimize or eliminate a shadow region. Thus, to capture a depth video at thirty frames per second, in practice, video at sixty frames per second may be obtained.

In operation, structured light device 100 may be utilized for facial recognition, body detection of a single user, detection of multiple users, recognition or detection of other objects, the like, and/or combinations thereof. For example, structured light device 100 may be utilized for facial recognition where depth information may be associated with a face, such as for face image recognition. In cases where a shadow region 208 is formed on a face of a user, depth information may not be accurate without IR signal 207 from second IR emitter 104 to reduce (or eliminate) shadow region 208. In another example, structured light device 100 may be utilized for body detection of a single user where a part of body such as an arm can be hidden behind user's body (e.g. a serving arm in a tennis game). In such a case, it can be hard to track the arm of the user without IR signal 207 from second IR emitter 104 to reduce (or eliminate) shadow region 208. In a further example, structured light device 100 may be utilized for detection of multiple users where many shadows may be formed. In such an example, shadows formed by users may hinder extraction of depth information on each user without IR signal 207 from second IR emitter 104 to reduce (or eliminate) shadow region 208.

Figure 3:
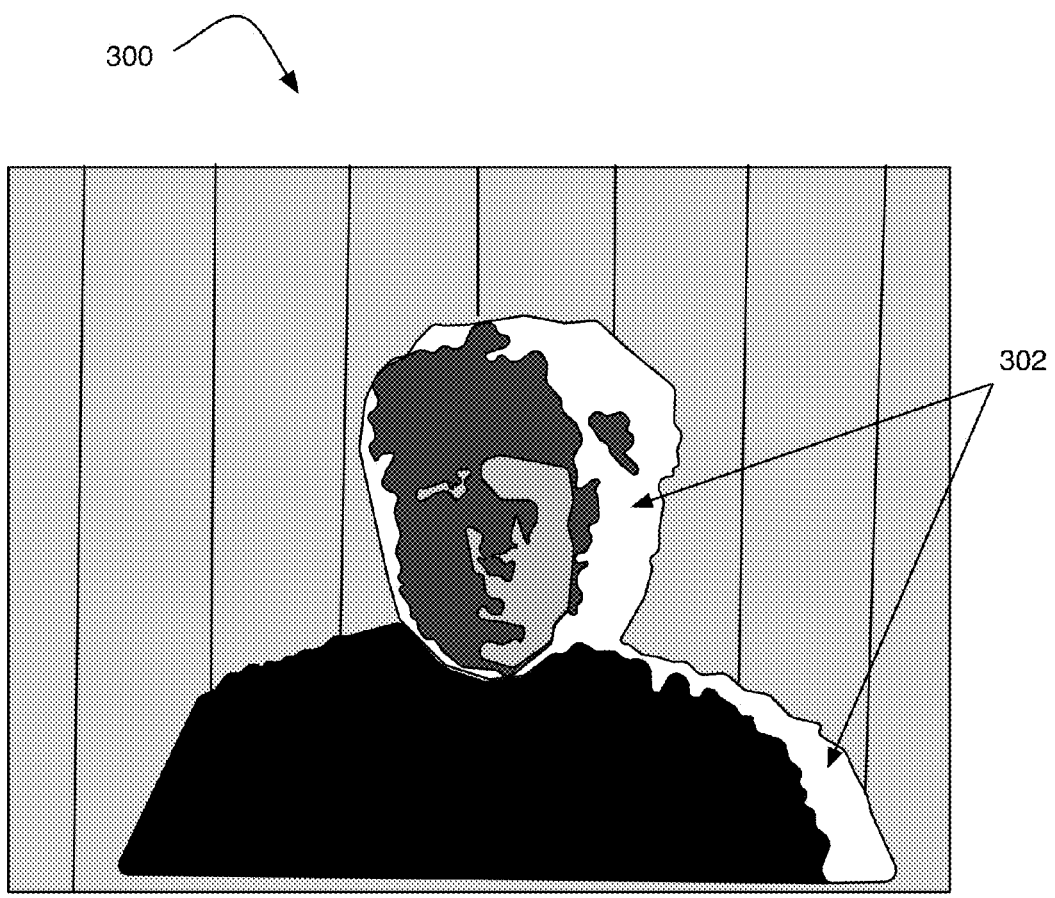
FIG. 3 illustrates an example captured image of an object that is arranged in accordance with at least some embodiments of the present disclosure.

FIG. 3 illustrates an example captured image of an object that is arranged in accordance with at least some embodiments of the present disclosure. In the illustrated example, a depth image 300 is shown. A single IR emitter has generated depth image 300. White parts on the right of the picture are a shadow region 302. Shadow region 302 shows that an IR pattern does not appear on the right side of the face since the single IR Emitter is located on the left of the picture. Shadow region 302 exists on the shoulder as well.

Other examples of causes of shadow regions may include situations where there are two users and/or where a portion of a user (e.g., an arm) is positioned away from the single IR emitter. For example, a shadow formed by a first user may affect a second user. Thus, it may be difficult to obtain accurate depth information about the second user. Similarly, in examples where an arm of a user is positioned away from the single IR emitter, it may be difficult to obtain accurate depth information about the location and/or position of the arm of the user.

Figure 4:
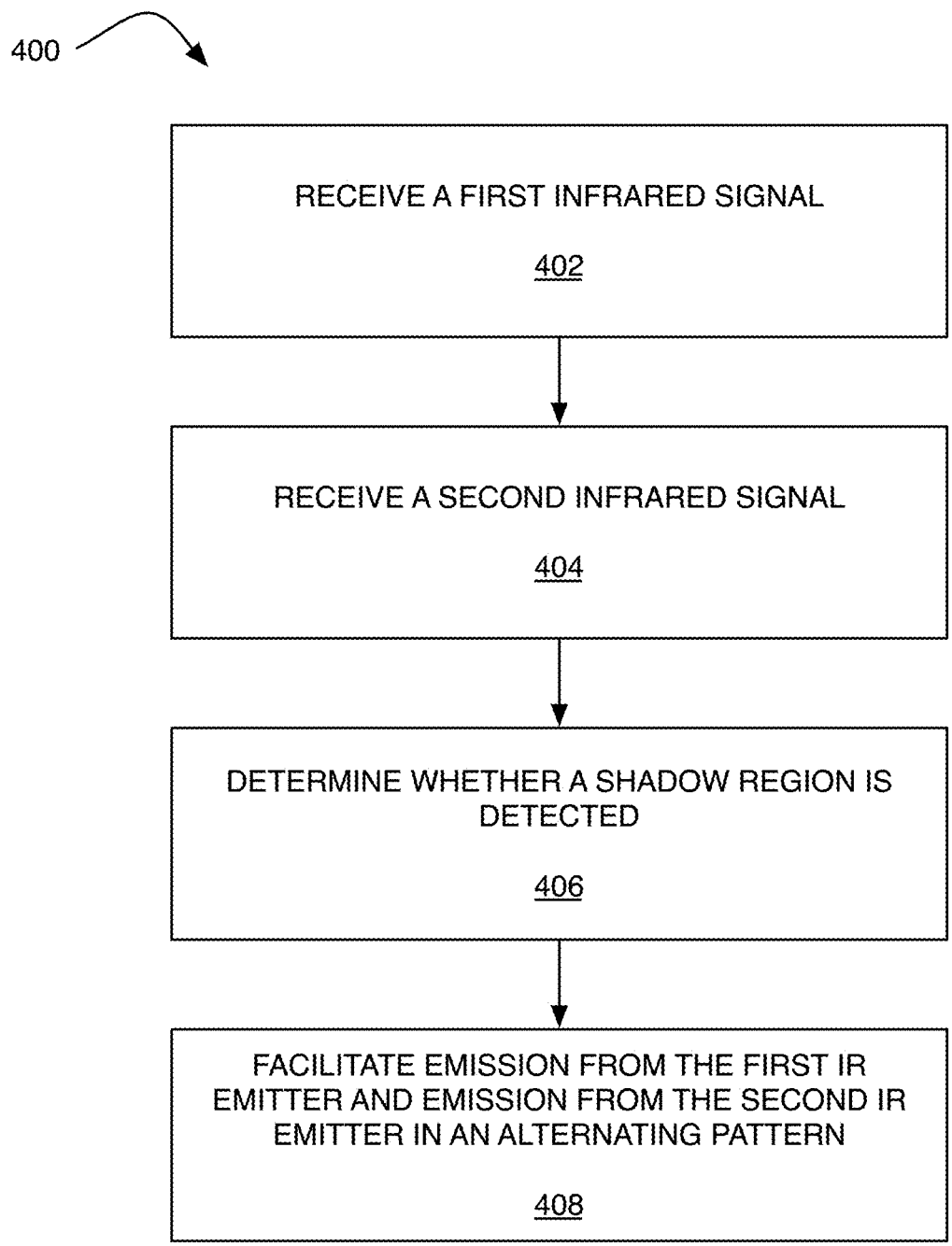
FIG. 4 illustrates an example process for capturing structured light images that is arranged in accordance with at least some embodiments of the present disclosure.

FIG. 4 illustrates an example process 400 for capturing structured light images that is arranged in accordance with at least some embodiments of the present disclosure. In the illustrated example, process 400, and other processes described herein, set forth various functional blocks or actions that may be described as processing steps, functional operations, events and/or acts, etc., which may be performed by hardware, software, and/or firmware. Those skilled in the art, in light of the present disclosure, will recognize that numerous alternatives to the functional blocks shown in FIG. 4 may be practiced in various implementations. For example, although process 400, as shown in FIG. 4, may comprise one particular order of blocks or actions, the order in which these blocks or actions are presented does not necessarily limit claimed subject matter to any particular order. Likewise, intervening actions not shown in FIG. 4 and/or additional actions not shown in FIG. 4 may be employed and/or some of the actions shown in FIG. 4 may be eliminated, without departing from the scope of claimed subject matter. Process 400 may include one or more of functional operations as indicated by example operations 402, 404, 406, and/or 408.

As illustrated, process 400 may be implemented for capturing structured light images that may be implemented in a structured light device (see, e.g., structured light device 100 of FIG. 1). Processing may begin at operation 402, "RECEIVE A FIRST INFRARED SIGNAL", where a first infrared (IR) signal may be received. For example, a first infrared (IR) signal may be received at the image capture device from a first IR emitter.

Processing may continue from operation 402 to operation 404, "RECEIVE A SECOND INFRARED SIGNAL", where a second infrared (IR) signal may be received. For example, a second IR signal may be received at the image capture device from a second IR emitter.

Processing may continue from operation 404 to operation 406, "DETERMINE WHETHER A SHADOW REGION IS DETECTED", where a determination may be made whether a shadow region is detected. For example, a determination may be made whether a shadow region is detected from the received first IR signal from the first IR emitter. In some examples, the determination of whether a shadow region is detected may include determining depth of an image based at least in part on the received first and second IR signals.

Processing may continue from operation 406 to operation 408, "FACILITATE EMISSION FROM THE FIRST IR EMITTER AND EMISSION FROM THE SECOND IR EMITTER IN AN ALTERNATING PATTERN", where emission from the first IR emitter and emission the second IR emitter may be facilitated in an alternating pattern. For example, emission of the first IR signal from the first IR emitter and emission of the second IR signal from the second IR emitter may be facilitated in an alternating pattern.

In operation, process 400 may include an operation utilizing an image corresponding to the received second IR signal from the second IR emitter if is determined that a shadow region is detected from the received first signal from the first IR emitter. Similarly, process 400 may include an operation utilizing an image corresponding to the received first IR signal from the first IR emitter if it is determined that a shadow region is not detected from the received first IR signal from the first IR emitter.

Figure 6:
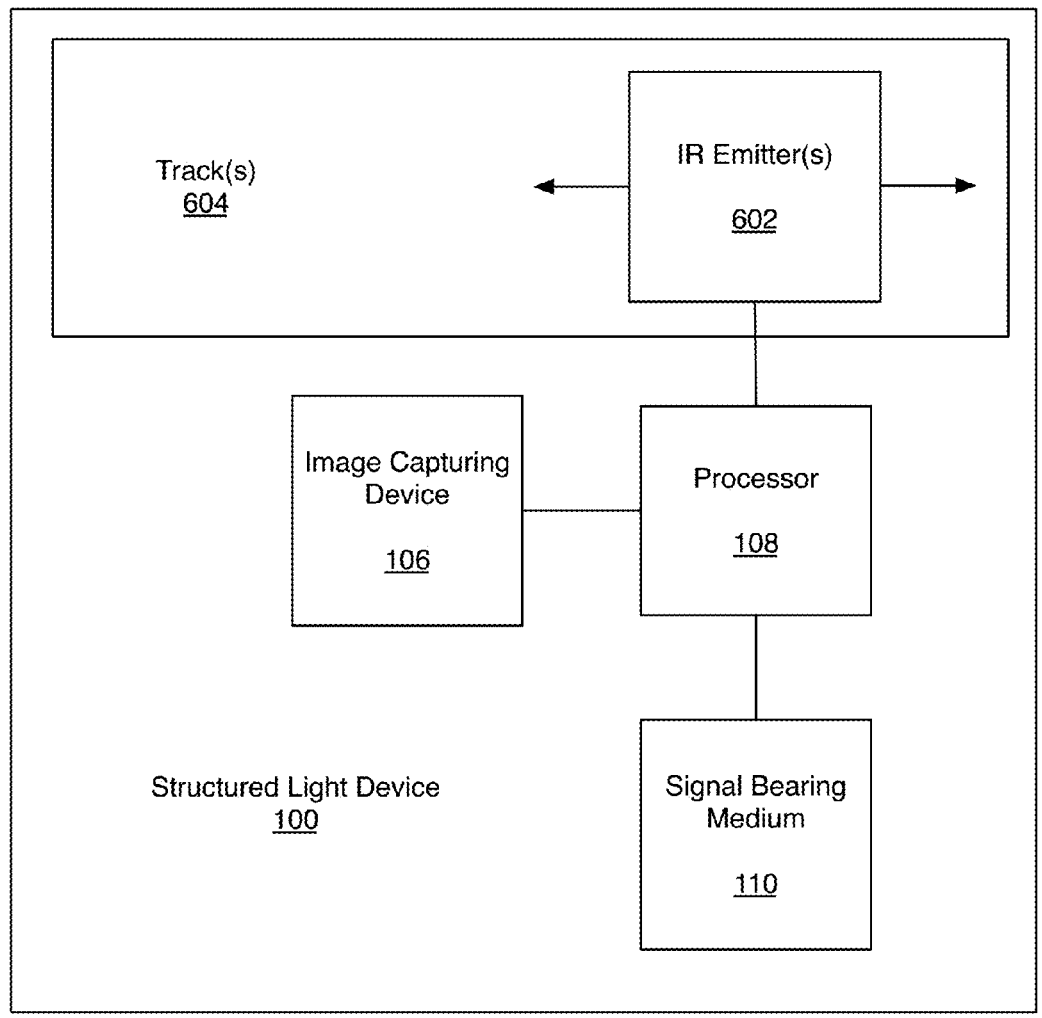
FIG. 6 illustrates another example structured light device that is arranged in accordance with at least some embodiments of the present disclosure.

While process 400 has been described above with respect to structured light device 100 of FIG. 1, in some examples, process 400 may be implemented in a structured light device 600 of FIG. 6. For example, as will be described in greater detail below, the first IR emitter and the second IR emitter may include each of a first IR emitter and a second IR emitter disposed on a track configured to move the first and second IR emitter in at least one of a substantially horizontal direction, a substantially vertical direction, or both a substantially vertical and a substantially horizontal direction. In such an example, the first and/or second IR emitters may be moved to alternative positions between readings.

In operation, process 400 may operate so as to obtain depth information by removing shadow regions. For example, two or more IR emitters (or one or more mobile IR emitters, e.g., see FIG. 6) may be utilized. A first image of an object may be captured with the first IR emitter on (or with the first IR emitter in a first position). In such an example, other IR emitters may not emit infrared rays in order to avoid interference. Similarly, a second image of the object may be captured with the second IR emitter on (or with the first IR emitter in a second position). Likewise, the other IR emitters, except for the second IR emitter, may not emit infrared ray in order to avoid interference. Additional images may be captured via additional (e.g., up to M number of IR emitters) IR emitters (and/or additional positions).

In some examples, depth images may be created without shadow region using the M number of images obtained. For example, shadow regions may be detected on an image-by-image basis from the M number of images obtained. In cases where a part of an image is detected as a shadow region, a better image may be used as a replacement. For example, IR pattern information associated with an image having a shadow region may be replaced IR pattern information associated with an image having no (or reduced) shadow region (e.g., an imaged obtained by another IR emitter or obtained at another position). Additionally or alternatively, a depth video may be captured with no (or reduced) shadow region by capturing repeated images from an IR emitter (or IR emitter position) that is associated with no (or reduced) shadow region; or a depth video may be captured with no (or reduced) shadow region by repeatedly selecting the best images from the M number of images obtained.

FIG. 5 illustrates an example computer program product 500 that is arranged in accordance with at least some examples of the present disclosure. Computer program product 500 may include a signal bearing medium 502. Signal bearing medium 502 may include one or more machine-readable instructions 504, which, if executed by one or more processors, may operatively enable a computing device to provide the functionality described above with respect to FIG. 4. Thus, for example, structured light device 100 (see, e.g., FIG. 1) may undertake one or more of the actions shown in FIG. 4 in response to instructions 504 conveyed by signal bearing medium 502.

In some implementations, signal bearing medium 502 may encompass a non-transitory computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass communications medium 510, such as, but not limited to, a digital and/or an analog communication medium (e.g., a fiber optic cable, a waveguide, a wired communications link, a wireless communication link, etc.).

FIG. 6 illustrates another example structured light device that is arranged in accordance with at least some embodiments of the present disclosure. In the illustrated example, a structured light device 600 may include one or more infrared (IR) emitter(s) 602, one or more tracks 604, image capture device 106, processor 108, and/or signal bearing medium 110.

IR emitter(s) 602 may be configured to emit an IR signal. IR emitter(s) 602 may be configured to move in at least one of a substantially horizontal direction, a substantially vertical direction, or a substantially horizontal and vertical direction. For example, IR emitter(s) 602 may be disposed on one or more track(s) 604. Such track(s) 604 may be configured to move IR emitter(s) 602 in at least one of a substantially horizontal direction, a substantially vertical direction, or a substantially horizontal and vertical direction. Image capture device 106 may be configured to receive IR signals from one or more positions of IR emitter(s) 602.

Processor 108 may be communicatively coupled to IR emitter(s) 602 and image capture device 106. Signal bearing medium 110 may include machine-readable instructions stored thereon, which, if executed by the processor, may operatively enable a computing device to move IR emitter(s) 602. For example, IR emitter(s) 602 may be moved via track 604.

In operation, the machine-readable instructions may operatively enable a computing device to determine depth of image based at least in part on IR signals from one or more positions of IR emitter(s) 602. Additionally or alternatively, the machine-readable instructions may operatively enable a computing device to determine a silhouetted object. For example, an object that doesn't have structured light pattern may be considered as silhouetted object. Additionally or alternatively, the machine-readable instructions may operatively enable a computing device to extrapolate a full object image from a partially obscured object.

In some examples, the machine-readable instructions may operatively enable a computing device to determine if a shadow region is detected from a received first IR signal from a first position of the IR emitter. In such an example, structured light device 600 may move IR emitter(s) 602 to a second position and to utilize an image corresponding to a received second IR signal from the second position of IR emitter(s) 602 if it is determined that a shadow region is detected from the received first IR signal from the first position of IR emitter(s) 602. Similarly, structured light device 600 may move IR emitter(s) 602 to a second position and to utilize an image corresponding to the received first IR signal from the first position of IR emitter(s) 602 if it is determined that a shadow region is not detected from the received first IR signal from the first position of IR emitter(s) 602.

Figure 7:
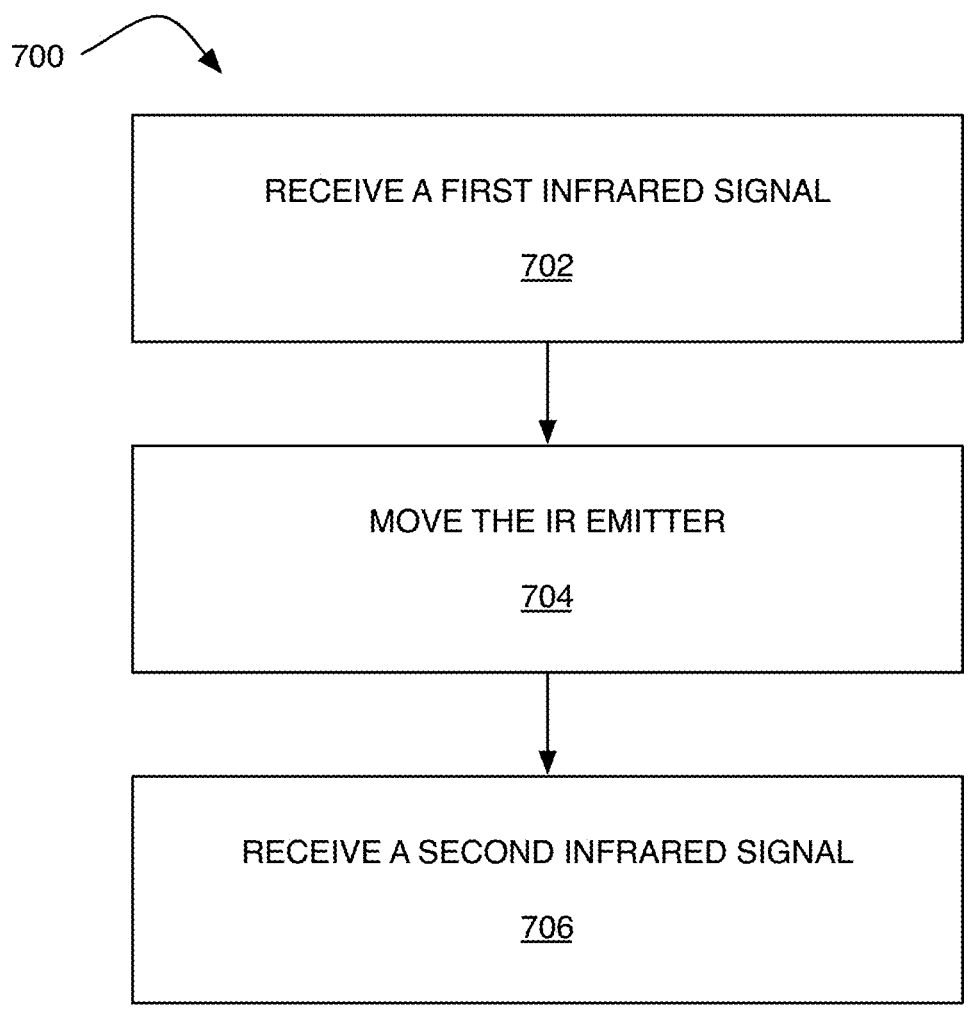
FIG. 7 illustrates another example process for capturing two-dimensional structured light images that is arranged in accordance with at least some embodiments of the present disclosure.

FIG. 7 illustrates another example process 700 for capturing structured light images that is arranged in accordance with at least some embodiments of the present disclosure. In the illustrated example, process 700 may include one or more of functional operations as indicated by example operations 702, 704, and/or 706.

As illustrated, process 700 may be implemented for capturing structured light images that may be implemented in a structured light device (see, e.g., structured light device 600 of FIG. 6). Processing may begin at operation 702, "RECEIVE A FIRST INFRARED SIGNAL", where a first infrared (IR) signal may be received. For example, a first infrared (IR) signal may be received at an image capture device from an IR emitter at a first position. In such an example, the IR emitter may be configured to move in at least one of a substantially horizontal direction, a substantially vertical direction, or a substantially horizontal and vertical direction.

Processing may continue from operation 702 to operation 704, "MOVE THE IR EMITTER", where the IR emitter may be moved. For example, the IR emitter may be moved to a second position.

Processing may continue from operation 704 to operation 706, "RECEIVE A SECOND INFRARED SIGNAL", where a second IR signal may be received. For example, a second IR signal may be received at the image capture device from the IR emitter at the second position.

In some examples, process 700 may include an operation to determine if a shadow region is detected from the received first IR signal from the first position of the IR emitter. In such examples, process 700 may include an operation to utilize an image corresponding to the received second IR signal from the second position of the IR emitter if it is determined that a shadow region is detected from the received first IR signal from the first position of the IR emitter. Similarly, process 700 may include an operation to utilize an image corresponding to the received first IR signal from the first position of the IR emitter if it is determined that a shadow region is not detected from the received first IR signal from the first position of the IR emitter. In some examples, the determination of whether a shadow region is detected may include determining depth of an image based at least in part on the received first and second IR signals.

FIG. 8 illustrates an example computer program product 800 that is arranged in accordance with at least some examples of the present disclosure. Computer program product 800 may include a signal bearing medium 802. Signal bearing medium 802 may include one or more machine-readable instructions 804, which, if executed by one or more processors, may operatively enable a computing device to provide the functionality described above with respect to FIG. 7. Thus, for example, structured light device 600 (see, e.g., FIG. 6) may undertake one or more of the actions shown in FIG. 7 in response to instructions 804 conveyed by signal bearing medium 802.

In some implementations, signal bearing medium 802 may encompass a non-transitory computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass communications medium 810, such as, but not limited to, a digital and/or an analog communication medium (e.g., a fiber optic cable, a waveguide, a wired communications link, a wireless communication link, etc.).

Figure 9:
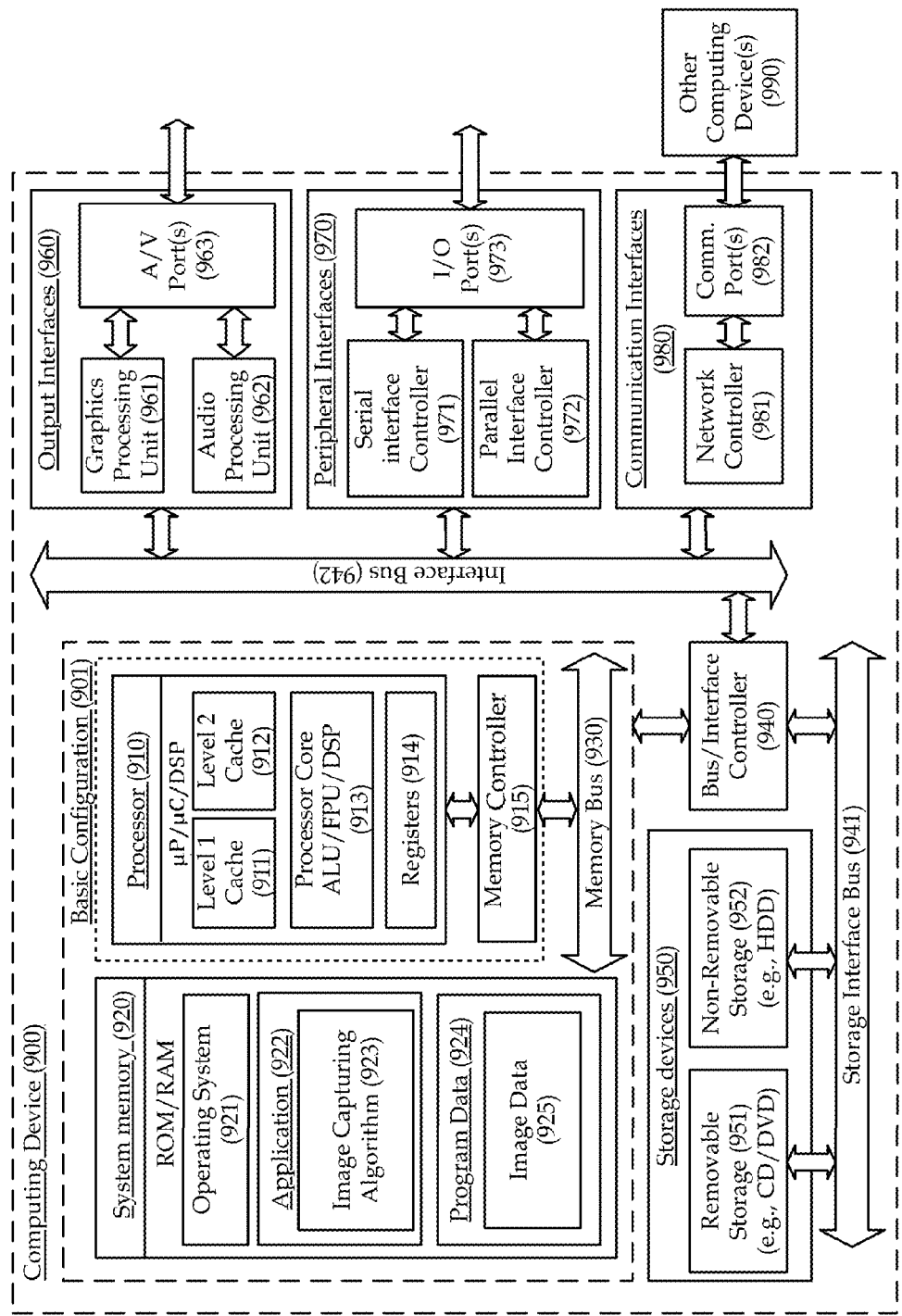
FIG. 9 is a block diagram of an illustrative embodiment of a computing device arranged in accordance with at least some embodiments of the present disclosure.

FIG. 9 is a block diagram illustrating an example computing device 900, such as might be embodied by a person skilled in the art, which is arranged in accordance with at least some embodiments of the present disclosure. In one example configuration 901, computing device 900 may include one or more processors 910 and system memory 920. A memory bus 930 may be used for communicating between the processor 910 and the system memory 920.

Depending on the desired configuration, processor 910 may be of any type including but not limited to a microprocessor (µP), a microcontroller (µC), a digital signal processor (DSP), or any combination thereof. Processor 910 may include one or more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 may also be used with the processor 910, or in some implementations the memory controller 915 may be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include an image capturing algorithm 923 that is arranged to perform the functions as described herein including the functional blocks and/or actions described with respect to process 400 of FIG. 4 and/or process 700 of FIG. 7. Program Data 924 may include image data 925 for use with image capturing algorithm 923. In some example embodiments, application 922 may be arranged to operate with program data 924 on an operating system 921 such that implementations of providing guidance to capture images may be provided as described herein. For example, structured light device 100 (see, e.g., FIG. 1) and/or structured light device 600 (see, e.g., FIG. 6) may comprise all or a portion of computing device 900 and be capable of performing all or a portion of application 922 such that implementations of capturing images may be provided as described herein. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 942 for facilitating communication from various interface devices (e.g., output interfaces, peripheral interfaces, and communication interfaces) to the basic configuration 901 via the bus/interface controller 940. Example output interfaces 960 may include a graphics processing unit 961 and an audio processing unit 962, which may be configured to communicate to various external devices such as a display or speakers via one or more A/V ports 963. Example peripheral interfaces 970 may include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which may be arranged to facilitate communications with one or more other computing devices 990 over a network communication via one or more communication ports 982. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 900 may also be implemented as a personal computer including both laptop computer and non-laptop computer configurations. In addition, computing device 900 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. An apparatus to reduce shadowing proximate to one or more objects within a region comprising:
    a first infrared (IR) emitter configured to at least partially illuminate an object within the region, wherein a shadow is created proximate to the object;
    a second IR emitter configured to at least partially illuminate the shadow to facilitate depth determination within the shadow;
    an image capture device to capture infrared signals in the region; and
    a processor configured to:
        determine a first depth information of a first image in the region based on a first infrared signal received from the image capturing device at a first time, the first infrared signal resulting from the first IR emitter;
        determine a second depth information of a second image in the region based on a second infrared signal received from the image capturing device at a second time, the second infrared signal resulting from the second IR emitter; and
        utilize the first depth information and the second depth information to reduce the shadow region proximate the object.

2. The apparatus as claimed in claim 1, wherein the processor is further configured to capture a first image when the first IR emitter illuminates the object and the second IR emitter is off, and to capture a second image when the second IR emitter illuminates the object and the first IR emitter is off.

3. The apparatus as claimed in claim 2, wherein the processor is further configured to combine the first image with the second image to at least partially eliminate the shadow in a combined image.

4. The apparatus as claimed in claim 1, further comprising a third infrared (IR) emitter configured to at least partially illuminate the shadow to facilitate depth determination within the shadow.

5. The apparatus as claimed in claim 4, wherein the processor is further configured to capture a first image when the first IR emitter illuminates the object and the second IR emitter and the third IR emitter are off, to capture a second image when the second IR emitter illuminates the object and the first IR emitter and the third IR emitter are off, and to capture a third image when the third IR emitter illuminates the object and the first IR emitter and the second IR emitter are off.

6. The apparatus as claimed in claim 5, wherein the processor is further configured to combine the first image, the second image, and the third image to at least partially eliminate the shadow in a combined image.

7. A processor-based method to reduce shadowing proximate to one or more objects within a region, comprising:
    at least partially illuminating an object within the region with a first infrared (IR) emitter, wherein a shadow region is created proximate to the object;
    at least partially illuminating the shadow region with a second IR emitter;
    capturing infrared signals in the region with an image capture device; and
    determining, in the processor, a first depth information of a first image in the region based on a first infrared signal received from the image capturing device at a first time, the first infrared signal resulting from the first IR emitter;
    determining, in the processor, a second depth information of a second image in the region based on a second infrared signal received from the image capturing device at a second time, the second infrared signal resulting from the second IR emitter; and
    utilizing the first depth information and the second depth information to reduce the shadow region proximate the object.

8. The method as claimed in claim 7, further comprising capturing a first image when the first IR emitter illuminates the object and the second IR emitter is off, and capturing a second image when the second IR emitter illuminates the object and the first IR emitter is off.

9. The method as claimed in claim 8, further comprising combining the first image with the second image to at least partially eliminate the shadow in a combined image.

10. The method as claimed in claim 7, further comprising at least partially illuminating the shadow with a third infrared (IR) emitter to facilitate depth determination within the shadow.

11. The method as claimed in claim 10, further comprising capturing a first image when the first IR emitter illuminates the object and the second IR emitter and the third IR emitter are off, capturing a second image when the second IR emitter illuminates the object and the first IR emitter and the third IR emitter are off, and capturing a third image when the third IR emitter illuminates the object and the first IR emitter and the second IR emitter are off.

12. The method as claimed in claim 11, further comprising combining the first image, the second image, and the third image to at least partially eliminate the shadow region in a combined image.

13. A non-transitory machine-readable medium having instructions stored thereon, wherein the instructions, if executed by a machine, result in determining a depth of one or more objects within a region by:
    at least partially illuminating an object within the region with a first infrared (IR) emitter, wherein a shadow region is created proximate to the object;
    at least partially illuminating the shadow region with a second IR emitter;
    capturing infrared signals in the region with an image capture device; and
    determining, in the processor, a first depth information of a first image in the region based on a first infrared signal received from the image capturing device at a first time, the first infrared signal resulting from the first IR emitter;
    determining, in the processor, a second depth information of a second image in the region based on a second infrared signal received from the image capturing device at a second time, the second infrared signal resulting from the second IR emitter; and utilizing the first depth information and the second depth information to reduce the shadow region proximate the object.

14. The non-transitory machine-readable medium as claimed in claim 13, further comprising instructions stored thereon, wherein the instructions, if executed by a machine, result in capturing a first image when the first IR emitter illuminates the object and the second IR emitter is off, and capturing a second image when the second IR emitter illuminates the object and the first IR emitter is off.

15. The non-transitory machine-readable medium as claimed in claim 14, further comprising instructions stored thereon, wherein the instructions, if executed by a machine, result in combining the first image with the second image to at least partially eliminate the shadow in a combined image.

16. The non-transitory machine-readable medium as claimed in claim 13, further comprising instructions stored thereon, wherein the instructions, if executed by a machine, result in at least partially illuminating the shadow with a third infrared (IR) emitter to facilitate depth determination within the shadow.

17. The non-transitory machine-readable medium as claimed in claim 16, further comprising instructions stored thereon, wherein the instructions, if executed by a machine, result in capturing a first image when the first IR emitter illuminates the object and the second IR emitter and the third IR emitter are off, capturing a second image when the second IR emitter illuminates the object and the first IR emitter and the third IR emitter are off, and capturing a third image when the third IR emitter illuminates the object and the first IR emitter and the second IR emitter are off.

18. The non-transitory machine-readable medium as claimed in claim 17, further comprising instructions stored thereon, wherein the instructions, if executed by a machine, result in combining the first image, the second image, and the third image to at least partially eliminate the shadow region in a combined image.

19. An apparatus to reduce shadowing proximate to one or more objects within a region, comprising:
    an image capturing device configured to capture an image of a region; and
    an array of infrared (IR) emitters configured to at least partially illuminate one or more objects within the region;
    wherein the image capturing device is capable of capturing a first image of the region at a first time when a first subset of the array of IR emitters is activated and a second subset of the array of IR emitters is off to at least partially illuminate the one or more objects within the region, wherein one or more shadows are created proximate to the one or more objects;
    wherein the imaging capturing device is capable of capturing a second image of the region at a second time when the second subset of the array of IR emitters is activated and the first subset of the array of IR emitters is off to at least partially illuminate the one or more objects with the region, wherein the one or more shadows are at least partially eliminated; and
    a processor configured to:
        determine a first depth information of the first image of the region based on the first image;
        determine a second depth information of a second image in the region based on the second image; and
        utilize the first depth information and the second depth information to reduce the shadow region proximate the object.

20. The apparatus as claimed in claim 19, wherein the image capturing device is capable of sending the first image and the second image to an external processor to determine a depth of the one or more objects using the first image and the second image.

* * * * *